United States Patent Office 3,804,806
Patented Apr. 16, 1974

3,804,806
ALKOXY ANILINES AS CURING AGENTS FOR EPOXY RESINS
John C. Grivas, South Holland, Ill., assignor to The Sherwin-Williams Company, Cleveland, Ohio
No Drawing. Filed Aug. 9, 1972, Ser. No. 279,118
Int. Cl. C08g 30/14
U.S. Cl. 260—47 EN          21 Claims

ABSTRACT OF THE DISCLOSURE

This invention relates to curable epoxy compositions and more specifically to polyepoxides containing effective amounts of alkylene-bis(alkoxyanilines) as curing agents.

---

This invention relates to epoxy compositions and more particularly to a curable epoxy composition having an improved pot life which is prepared by adding effective amounts of one or more alkylene-bis(alkoxyanilines) to polyepoxides. More specifically, this invention relates to a process for curing polyepoxides and to the cured resins obtained therefrom which comprises adding one or more methylene-bis(alkoxyanilines) to a polyepoxide having more than one epoxide group per molecule and curing same at temperatures ranging up to about 250° C.

It is generally known that polyepoxides may be cured with various amines to form insoluble, crosslinked high molecular weight epoxy resins. These amines, however, are usually bi-or trifunctional primary amines which react with the epoxides rather rapidly and therefore makes it rather difficult to use them in formulating paints, lacquers, etc. Moreover, the rapid reaction between the curing agent and the polyepoxide is accompanied by the evolution of heat causing the mixture to gel within a short period after being prepared. Thus, to avoid the problem, tertiary amines have been used as curing agents to decrease not only the amount of heat generally evolved, but also to improve the pot life of the resin. However, tertiary amines have been found to impart poor mechanical characteristics, e.g. flexural strengths, impact-resistance, etc. to the resins so that their use has not been entirely satisfactory.

It has been found that by using an effective amount, e.g. at least about 1.0 equivalent of one or more alkylene-bis(alkoxy-alkyl-substituted anilines) as the curing agent, it is possible to obtain a curable epoxy composition which has a longer pot life and, therefore, curing does not occur either during blending or some other similar operation, e.g. during casting, coating, laminating, molding, etc. Moreover, the polyepoxides cured according to this invention have improved mechanical characteristics and an exotherm sufficiently low that heat generated during the curing reaction does not become uncontrollable.

Accordingly, it is an object of this invention to provide a curable epoxy composition having an improved pot life. It is another object to provide a cured polyepoxide composition having improved mechanical characteristics prepared by utilizing curing agents which provide a relatively long shelf life. It is another object to provide a method for improving the pot life of a mixture of an uncured polyepoxide and a curing agent. It is a further object of this invention to provide a cured polyepoxide having improved physical characteristics and a high heat distortion temperature. These and other objects will become apparent from a further more detailed description of the invention.

More specifically, a curable epoxy composition may be prepared by adding to at least one polyepoxide, e.g. the reaction product of epichlorohydrin and 2,2'-bis(4-hydroxyphenyl) propane an effective amount, i.e. a stoichiometric amount of at least one curing agent having the Formulae I, II or III:

(I) 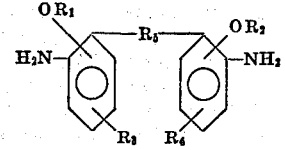

(II) 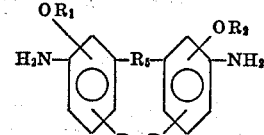

(III) 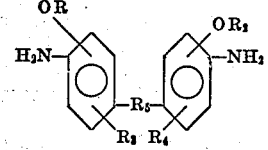

wherein $R_1$, $R_2$, $R_3$ and $R_4$ independently are selected from the class consisting of phenyl, cycloalkyl and lower alkyl radicals having 1 to 8 carbon atoms and $R_5$ is an aliphatic radical of 1 to 3 carbon atoms. Preferably, the curable epoxy composition is characterized as having an improved pot life and comprises at least one polyepoxide having more than one epoxide group per molecule and a stoichiometric amount, i.e. at least about 1.0 equivalent of at least one curing agent characterized by the above-identified formulae wherein $R_1$, $R_2$, $R_3$ and $R_4$ are cycloalkyl or lower alkyl radicals having 1 to 8 and preferably 1 to 4 carbon atoms and $R_5$ is an aliphatic radical such as methylene, etc.

Specifically, the curing agents of this invention, i.e. the alkylene-bis(alkyl-substituted alkoxy-anilines) may be characterized by the above-identified formulae wherein the radicals $R_1$, $R_2$, $R_3$ and $R_4$ are either the same or different, i.e. phenyl, cycloalkyl or alkyl radicals of 1 to 8 carbon atoms including either the straight or branch chain radicals, such as methyl, ethyl, propyl, n-butyl, isobutyl, pentyl, hexyl, heptyl and octyl radicals, and $R_5$ is an aliphatic radical having 1 to 3 carbon atoms. Specific examples include, 4,4'-methyl-bis(5-methyl-2-pentoxyaniline);
3,3'-methylene-bis(5-methyl-2-pentoxyaniline);
3,3'-methylene-bis(5-methyl-2-methoxyaniline);
4,4'-propylene-bis(3-methyl-5-pentoxyaniline);
3,3'-methylene-bis(5-ethyl-2-pentoxyaniline);
3,3'-methylene-bis(5-ethyl-2-butoxyaniline);
4,4'-propylene-bis(2-heptyl-5-isopropoxyaniline);
2,2'-alkylene-bis(4-methyl-6-pentoxyaniline);
2,2'-methylene-bis(4-ethyl-6-butoxyaniline);
4,4'-methylene-bis(5-methyl-2-methoxyaniline);
4,4'-methylene-bis(3-propyl-2-isobutoxyaniline);
3,3'-methylene-bis(5-propyl-2-methoxyaniline);
4,4'-methylene-bis(5-methyl-2-benzyloxyaniline);
3,3'-methylene-bis(5-methyl-2-benzyloxyaniline);
3,3'-alkylene-bis(5-methyl-2-hexyloxyaniline);
4,4'-methylene-bis(5-methyl-2-heptyloxyaniline), etc.

and combinations thereof in various proportions.

An effective amount, i.e. a stoichiometric amount or at least about 1.0 equivalent of the curing agent such as 3,3'-methylene-bis(2-methyl-5-pentoxyaniline) is used for each epoxy group present in each molecule of polyepoxide. However, depending upon the compositions, i.e. the compositions of the curing agents and the epoxides, the curing agents may be added to the polyepoxides in various amounts ranging up to 100% or more, e.g. 10 to about 100% by weight. The equivalent weight of the curing agent, which preferably reacts stoichiometrically with the polyepoxide, may be calculated by dividing the molecular weight of said curing agent by four (4), since each of the four hydrogen atoms attached to the nitrogen atoms are capable of reacting with an epoxide group of the polyepoxide. Thus, for example, the equivalent weight of 3,3'-methylene-bis(5-methyl-2-pentoxyaniline) is the molecular weight of the compound divided by four.

For purposes of this invention, the term "epoxide" includes compounds having more than one (1.0) oxirane group, i.e. an oxygen atom bonded to vicinal aliphatic carbon atoms which may be characterized by the formula

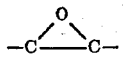

However, it should be understood that many of the commercially available polyepoxides are mixtures of epoxides whose average molecular weight differ from one another and therefore contain epoxides whose terminal epoxide groups have been partially hydrolyzed. Thus, an analytical determination of the epoxide equivalent may not be a whole number, e.g. at least 2.0 but in fact may be a fraction greater than 1.0.

Of the various polyepoxides available, particularly suitable for purposes of this invention, are the polyepoxides that are liquid at room temperature and include, for example, the epoxides derived from bis(parahydroxyphenyl)-dimethylmethane which may have an average epoxide content greater than 3.0 and may range up to about 6.0 epoxide equivalents per kilogram. Other polyepoxides having an epoxy equivalent greater than 1.0 and, therefore, suitable for purposes of this invention, are disclosed, for example, in U.S. Pats. 2,633,458; 2,456,408; 2,668,805; 2,668,807; 2,615,007; 2,698,315; 2,538,072; 2,712,000; 2,581,464; 2,830,038; and 2,888,439.

Specifically, the polyepoxides may include compounds which have more than one and preferably at least two vicinal epoxy groups and may be characterized either as saturated or unsaturated, aliphatic, cycloaliphatic, aromatic or heterocyclic compounds. The epoxy compounds may be monomeric or polymeric and may contain various substituents such as chlorine, hydroxyl groups, ether radicals, etc. For purposes of characterization, the epoxides and particularly the epoxides of the polymeric type are described in terms of their epoxy-equivalent value and for purposes of this invention must have an epoxy-equivalent value greater than 1.0.

The polyepoxides, for example, may include the epoxidized esters of the polyethylenically unsaturated monocarboxylic acids, e.g. the epoxidized linseed, soybean, tung, walnut, dehydrated castor oil, methyl linoleate, butyl linoleate, butyl eleostearate, the glycerides of tung oil fatty acids, the glycerides of soybean oil, the glycerides of sunflower oil, rapeseed oil, hempseed oil, cottonseed and other fatty oils. The epoxy-containing compounds may include the epoxidized esters of the unsaturated monohydric alcohols and polycarboxylic acids such as di(2,3-epoxybutyl) adipate; di(2,3-epoxyhexyl) succinate; di(2,3-epoxybutyl) oxalate; di(2,3-epoxyoctyl) pimelate; di(3,4-epoxybutyl) maleate; di(2,3-epoxybutyl) phthalate; di(4,5-epoxydodecyl) maleate; di(2,3-epoxyoctyl) tetrahydrophthalate; di(2,3-epoxybutyl) teraphthalate; di(5,6-epoxytetradecyl) diphenyldicarboxylate; tri(2,3 - epoxybutyl) 1,2,4-butanetricarboxylate; di(5,6-epoxytetradecyl) tartarate; di(4,5-epoxytetradecyl) maleate; di(2,3-epoxybutyl) azelate; di(3,4-epoxybutyl) citrate; di(4,5-epoxyoctyldecyl) malonate; etc.

Other epoxy-containing compounds include the epoxidized esters of unsaturated alcohols and unsaturated carboxylic acids including, for example, 2,3-epoxybutyl 3,4-epoxy pentanoate; 3,4-epoxyhexyl 3,4-epoxy pentanoate; 3,4 - epoxycyclohexyl 4,5 - epoxy octanoate; 2,3-epoxycyclohexylmethyl epoxycyclohexane; epoxy cyclohexane carboxylate, etc. Other epoxy-containing compounds include the epoxidized derivatives of the polyethylenically unsaturated polycarboxylic acids including, for example, dibutyl 7,8,11,12-diepoxyoctadecanedioate;
dihexyl 6,7,10,11-diepoxyhexadecanedioate;
dibutyl 3-butyl-3,4,5,6-diepoxycyclohexane-1,2-dicarboxylate;
dibenzyl 1,2,4,5-diepoxycyclohexane-1,2-dicarboxylate;
dicyclohexyl 3,4,5,6-diepoxycyclohexane-1,2-dicarboxylate;
diethyl-5,6,10,11-diepoxyoctadecyl succinate; etc.

Other epoxidized polyesters include, esters obtained by reacting an unsaturated polyhydric alcohol with an unsaturated polycarboxylic acid or the anhydride thereof including, for example, the polyesters obtained by reacting a glycol, i.e. ethylene glycol or diethylene glycol with a dicarboxylic acid such as 2-cycloalkyl-1,4-dicarboxylic acid, etc. In addition, epoxidized polymers and copolymers of diolefins, e.g. butadiene may be used including epoxidized butadiene-acrylonitrile copolymers, epoxidized butadiene-styrene copolymers and the like. Preferred polyepoxides, include the glycidyl ethers and particularly the glycidyl ethers of polyhydric phenols and polyhydric alcohols obtained by reacting, for example, an epihalohydrin with a polyhydric phenol in the presence of an alkaline material such as NaOH etc. The polyglycidyl ethers may be derived from hydroxy compounds such as ethylene glycol, diethylene glycol, triethylene glycol, 1,4-butylene glycol, 1,5-pentanediol, 2,4,6-hexane triol, glycerol and the polyphenols such as resorcinol, pyrocatechol, hydroquinone, phenolformaldehyde condensation products, bis (parahydroxyphenol)-methylphenylmethane; bis(parahydroxyphenyl) tolylmethane, etc. Other polyglycidyl ethers of polyhydric phenols may be obtained by reacting an epihalohydrin such as epichlorohydrin, glycerol dichlorohydrin, 3-chloro-1,2-epoxy butane, 3-bromo-1,2-epoxyhexane, etc. with various phenols including, cresol, xylenol, ethylphenol, butylphenol, isopropylmethoxy phenol, chlorophenol, naphthol, etc.

The curable epoxy compositions may be prepared in various solvents which may include, for example, the various organic liquids which escape from the composition by evaporation during or before the curing step. These solvents include, for example, the esters such as butyl acetate, ethyl acetate, acetates of ethylene glycol monoethyl ether (Cellosolve acetate), methyl Cellosolve acetate, the ethers alcohols such as methyl, ethyl or butyl ether of ethylene glycol or diethylene glycol; the chlorinated hydrocarbons such as trichloropropane, chloroform, etc. In addition, one or more of these solvents may be used in admixture with various aromatic hydrocarbons such as benzene, xylene, etc. and/or the alcohols such as ethyl, propyl, isopropyl, butyl, isobutyl, etc.

The following examples illustrate the curing agents and methods of preparing same for purposes of this invention. All quantities in the examples are in parts by weight.

EXAMPLE 1

2,2'-methylene-bis(4-methyl-6-nitrophenol)

Approximately 165 parts of a 37% aqueous solution of formaldehyde, was added dropwise with stirring to about 360 parts of a 97% sulfuric acid at temperatures below 30° C. over a period of about 1 hour. This solution then was added dropwise to a mixture of about 505 parts of 3-nitro-p-cresol in about 75 parts of water at temperatures of about 75° C. During the addition, the temperature was increased slowly to about 105° C. The mixture became progressively thick so that near the end of the addition, the stirring was stopped. After the addition was completed, the mixture was held at temperatures of 120° to 125° C. for about 1 hour, cooled, and then about 1000 parts of water was added thereto. The product was filtered, washed with water and then added to about 2000 parts of water, neutralized with aqueous sodium bicarbonate, filtered, washed with water and stirred into 1000 parts of ethanol for about 30 minutes. The product was filtered and dried to obtain a yield of about 471.3 parts. The product then was dissolved in about 5000 parts of chloroform, decolorized with charcoal, concentrated to about 4000 parts and precipitated by the addition of about 3500 parts of ethanol, cooled, filtered and dried. Approximately 407 parts (77% of theory) of a product having a melting point of 183° to 184.5° C. was obtained.

Analysis of $C_{15}H_{14}N_2O_6$: Calcd. (percent): C, 56.60; H, 4.43; N, 8.8. Found (percent): C, 56.73; H, 4.29; N, 8.85.

EXAMPLE 2

2,2'-dimethoxy-5,5'-dimethyl-3,3'-dinitrodiphenylmethane

A mixture of about 318.5 parts of 2,2'-methylene bis(4-methyl-6-nitrophenol), about 504.5 parts of dimethyl sulfate and about 424 parts of anhydrous sodium carbonate was refluxed in acetone for about 24 hours, cooled and filtered. The filtrate was evaporated until almost all of the acetone was driven off and then poured into about 3 liters of water and stirred for about 30 minutes. The precipitate was filtered off, washed with water and dried to give approximately 346 parts of product which had a melting point of 101°–104° C. The compound was recrystallized from ethanol and found to have a melting point of 106°–108° C. and a yield of approximately 86%.

Analysis of $C_{17}H_{18}N_2O_6$: Calcd. (percent): C, 58.95; H, 5.24; N, 8.09. Found (percent): C, 58.87; H, 5.29; N, 8.05.

EXAMPLE 3

3,3'-methylene-bis(2-methoxy-5-methylaniline)

The product from Example 2 was dissolved in ethanol and hydrogenated in a Parr apparatus at 40 p.s.i. in the presence of 1.0 part of a 5% platinum-charcoal catalyst. The solution was freed from the catalyst by filtration and evaporated to dryness to yield a product which could not be distilled at 200° C./0.1 mm. The product was purified by recrystallization from methanol to obtain a yield of approximately 90% of theory. The product had a melting point of 128°–129° C.

Analysis of $C_{17}H_{22}N_2O_2$: Calcd. (percent): C, 71.30; H, 7.77; N, 9.78. Found (percent): C, 71.12; H, 7.74; N, 9.92.

EXAMPLE 4

3,3'-dimethyl-5,5'-dinitro-6,6'-dipentoxydiphenyl-methane

A mixture of about 34.8 parts of the sodium salt of 2,2'-methylene-bis(4-methyl - 6 - nitrophenol), about 32 parts of 1-chloropentane and about 3 parts of potassium iodide in about 200 parts of dry dimethylformamide was heated at 110° C. The reaction mixture was cooled, poured into about 2000 parts of water and extracted with benzene. The benzene extract was washed with a 5% sodium hydroxide aqueous solution and evaporated to dryness to obtain a yield of about 43.8 parts of product which could not be purified by distillation in a vacuum at 0.1 mm. The pure product was obtained by column chromatography at a yield of about 78% of theory.

Analysis of $C_{25}H_{34}N_2O_6$: Calcd. (percent): C, 65.48; H, 7.47; N, 6.11. Found (percent): C, 65.70; H, 7.57; N, 6.01.

EXAMPLE 5

3,3'-methylene-bis(5-methyl-2-pentoxyaniline)

About 7 parts of 3,3'-dimethyl-5,5'-dinitro-6,6'-dipentoxyphenyl-methane as prepared in Example 4 was dissolved in ethanol and hydrogenated in a Parr apparatus at 40 p.s.i. in the presence of 1.0 part of a 5% platinum-charcoal catalyst. The solution was freed from the catalyst by filtration and evaporated to dryness to yield a substantially pure product which could not be distilled at 200° C./0.1 mm. An analytical sample was prepared as a yellow liquid by column chromatography on alumina.

Analysis of $C_{25}H_{38}N_2O_2$: Calcd. (percent): C, 75.33; H, 9.61; N, 7.03. Found (percent): C, 75.17; H, 9.65; N, 6.97.

EXAMPLE 6

4,4'-methylene-bis(3-methyl-6-methoxyaniline)

A mixture of approximately 823 parts of p-cresidine, 81 parts of 37% formaldehyde and 165 parts of concentrated hydrochloric acid was heated on a steam bath for 5 hours, cooled and then taken up in 3 liters of chloroform. Approximately 80 parts of sodium hydroxide in water was added to the mixture and the chloroform layer was separated and evaporated to dryness, yielding an oil product. Fractional distillation of this oil portion resulted in the recovery of the excess of p-cresidine and about 236.4 parts of a product having a boiling point ranging from about 165° to 207° C. The product was purified by crystallization from methylene chloridehexane to give a yield of approximately 62% of theory. The product had a melting point of 106° to 107° C.

Analysis of $C_{17}H_{22}N_2O_2$: Calcd. (percent): C, 71.30; H, 7.74; N, 9.78. Found (percent): C, 71.06; H, 7.75; N, 9.71.

EXAMPLE 7

3-nitro-4-pentoxy-toluene

A mixture of about 30.6 parts of 4-hydroxy-3-nitrotoluene, 38 parts of 1-bromopentane, 34.5 parts of anhydrous potassium carbonate and about 1 part of potassium iodide in 300 parts of acetone was stirred at reflux temperatures. The reaction mixture was then filtered and the filtrate was evaporated to dryness. The product was fractionated in a vacuum to give a pure product in a yield of about 52% of theory. The product had a boiling point of 120° C. at 0.55 mm.

Analysis of $C_{12}H_{17}NO_3$ Calcd. (percent): C, 64.55; H, 7.68; N, 6.27. Found (percent): C, 64.80; H, 7.82; N, 6.24.

EXAMPLE 8

3-methyl-6-pentoxyaniline

Approximately 27.8 parts of 3-nitro-4-pentoxytoluene as prepared in Example 7 in 500 parts of ethanol was hydrogenated in the presence of 1.0 part of 5% of a platinum-charcoal catalyst in a Parr autoclave at 300 p.s.i. at 25° to 40° C. The reaction mixture was filtered, evaporated to dryness and the oil residue was fractionated to give the product in 93% yield. The product had a boiling point of 97° C. at 0.45 mm.

EXAMPLE 9

4,4'-methylene-bis(3-methyl-6-pentoxyaniline)

A mixture of about 193 parts of 3-methyl-6-pentoxyaniline as prepared in Example 8, 40 parts of a 37% formaldehyde and 85 parts of concentrated hydrochloric acid was heated on a steam bath for about 5 hours, cooled and taken up in about 3 liters of chloroform. To this mixture was added about 50 parts of an aqueous sodium hydroxide solution. The chloroform layer separated and the product was evaporated to dryness. The product was purified by column chromatography followed by crystallization from methylene chloridehexane. The purified product had a melting point of 46° to 47° C.

Analysis of $C_{25}H_{38}N_2O_2$: Calcd. (percent): C, 75.33; H, 9.61; N, 7.03. Found (percent): C, 75.07; H, 9.54; N, 6.90.

Methods for preparing the curing agents of this invention may be illustrated by Equations I and II.

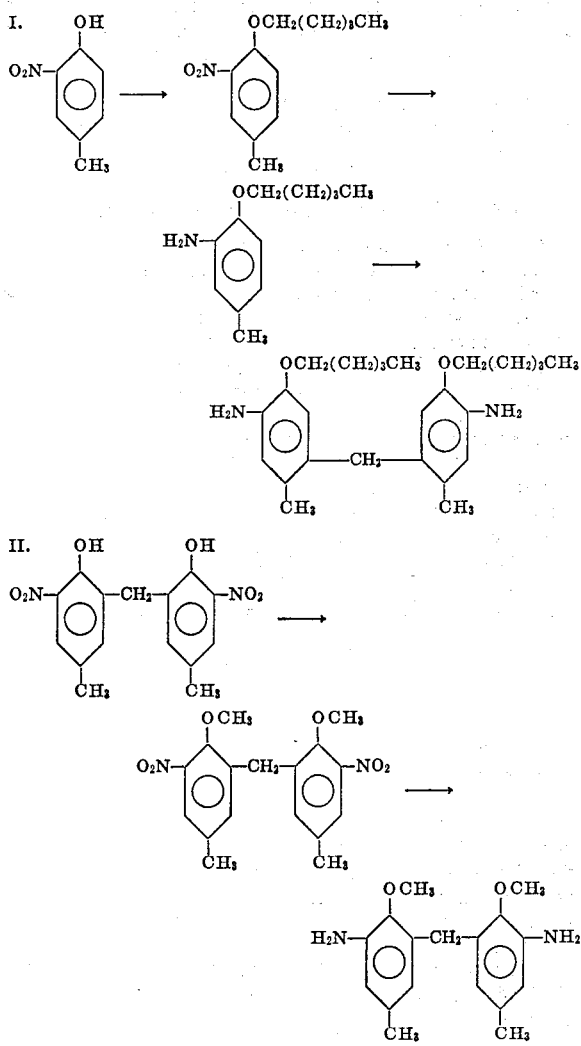

In preparing the epoxy resins, the curing agents may be mixed with the polyepoxides in amounts ranging up to 100% by weight or more and are blended and cured at temperatures as low as 25° C. and as high as 250° C. and preferably at temperatures ranging from 50° C. to about 200° C. or 50° C. to 150° C., e.g. about 100° C.

The following examples illustrate the pot life of the curing agents of this invention.

EXAMPLE A

Approximately equivalent parts of a polyepoxide and of 3,3' - methylene - bis(5 - methyl-2-pentoxyaniline) were mixed and heated to a temperature of about 100° C. After mixing, the blend was placed in an oven at about 100° C. and the amount of time required for the blend to become unpourable was determined. The polyepoxide was obtained from epichlorohydrin and bisphenol-A, which has an epoxide equivalent of about 188 and an average molecular weight of about 380. The pot life of the resin was approximately 240 minutes.

EXAMPLE B

Approximately equivalent parts of the polyepoxide as described in Example A and 4,4'-methylene-bis(5-methyl-2-pentoxyaniline) were mixed and heated to a temperature of about 100° C. The mixture was held at about 100° C. in an oven and the time required for the mixture to become unpourable was determined. The pot life of the resin was approximately 90 minutes.

EXAMPLE C

Approximately equal parts by weight of the polyepoxide of Example A and 3,3'-methylene bis(5-methyl - 2 - methoxy aniline) were mixed and heated to a temperature of about 100° C. The mixture was placed in an oven at a temperature of about 100° C. and the amount of time required for the mixture to become unpourable was determined. The pot life of the resin was approximately 150 minutes.

Depending upon the ultimate use of the epoxy compositions, various additives may be included such as, for example, fillers, e.g., aluminum powder, asbestos, mica, zinc dust, clay, glass fibers, and various other known additives such as stabilizers, plasticizers, etc. In addition, various known resins may be added to the epoxy compositions in amounts ranging up to about 30% by weight and include, for example, the phenol-aldehyde resins, phenol-urea resins, the vinyl resins, the polyolefins, the synthetic rubbers and some solid particles of nylon, rayon, Dacron and the like.

The epoxy compositions may be utilized in various commercial applications particularly including, for example, in the formulation of surface coatings, etc. In addition, the compositions may be used in the preparation of laminated sheets wherein the fibers, e.g., glass fibers, etc., are impregnated with the epoxy composition. For example, a plurality of impregnated glass fiber sheets, may be superimposed and cured at temperatures ranging up to about 250° C. and at pressures ranging up to 500 pounds per square inch or more.

While this invention has been described by a number of specific embodiments, it is obvious that other modifications can be made without departing from the spirit and scope of the invention as particularly pointed out in the appended claims.

What is claimed is:

1. A curable epoxy composition having an improved pot life which comprises at least one polyepoxide having more than one epoxide group wherein the oxygen atom is bonded to vicinal carbon atoms per molecule and about a stoichiometric amount of at least one curing agent having the Formula I, II or III:

(I) 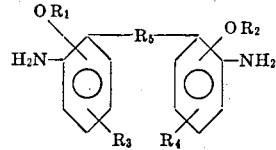

(II) 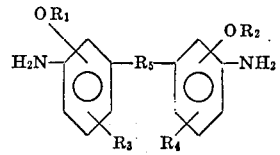

(III) 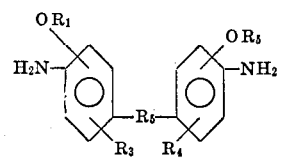

wherein $R_1$, $R_2$, $R_3$ and $R_4$ independently are selected from the class consisting of phenyl, cycloalkyl and lower alkyl radicals having 1 to 8 carbon atoms and $R_5$ is an aliphatic radical of 1 to 3 carbon atoms.

2. The composition of claim 1 further characterized in that $R_1$ and $R_2$ are lower alkyl radicals of 1 to 5 carbon atoms.

3. The composition of claim 1 further characterized in that $R_3$ and $R_4$ are methyl radicals.

4. The composition of claim 1 further characterized in that $R_1$ and $R_2$ are phenyl radicals.

5. The composition of claim 1 further characterized in that $R_5$ is a methylene radical.

6. The composition of claim 1 further characterized in that $R_1$ and $R_2$ are cycloalkyl radicals.

7. The composition of claim 1 further characterized in that $R_3$ and $R_4$ are alkyl radicals.

8. The composition of claim 1 further characterized in that $R_1$, $R_2$, $R_3$ and $R_4$ are methyl radicals.

9. The composition of claim 1 further characterized in that $R_1$ and $R_2$ are pentyl radicals and $R_3$ and $R_4$ are methyl radicals.

10. A process for preparing a curable epoxy composition having an improved pot life which comprises adding to a polyepoxide having more than one epoxide group wherein the oxygen atom is bonded to vicinal carbon atoms a stoichiometric amount of at least one curing agent having the formulae I, II or III:

(I) 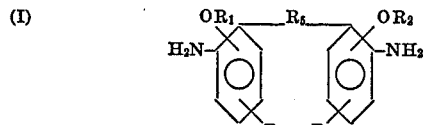

(II) 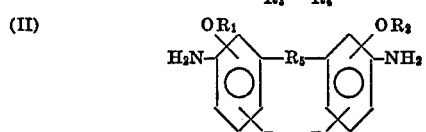

(III) 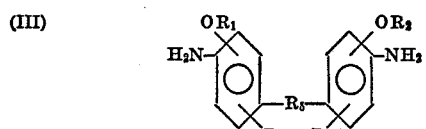

wherein $R_1$, $R_2$, $R_3$ and $R_4$ independently are selected from the class consisting of phenyl, cycloalkyl and lower alkyl radicals having 1 to 8 carbon atoms and $R_5$ is an aliphatic radical from 1 to 3 carbon atoms.

11. A process for preparing a cured epoxy resin which comprises heating the composition of claim 10 to temperatures ranging from 50° C. to about 150° C.

12. A cured epoxy resin obtained by heating the composition of claim 1 to temperatures of at least about 25° C.

13. The cured epoxy resin of claim 12 further characterized in that the temperature ranges from about 50° C. to 150° C.

14. The process of claim 11 further characterized in that $R_1$ and $R_2$ independently are lower alkyl radicals of 1 to 8 carbon atoms and $R_3$ and $R_4$ are methyl radicals.

15. The composition of claim 1 further characterized in that the curing agent is 4,4'-methylene bis(5-methyl-2-pentoxy aniline).

16. The composition of claim 1 further characterized in that the curing agent is 3,3'-methylene bis(5-methyl-2-pentoxy aniline).

17. The composition of claim 1 further characterized in that the curing agent is 3,3'-methylene bis(5-methyl-2-ethoxy aniline).

18. The composition of claim 1 further characterized in that the curing agent is 3,3'-methylene bis(5-methyl-2-methoxy aniline).

19. The process of claim 10 further characterized in that the curing agent is 4,4'-methylene bis(3-methyl-2-methoxy aniline).

20. The process of claim 10 further characterized in that the curing agent is 4,4'-methylene bis(5-methyl-3-pentoxy aniline).

21. A curable epoxy composition which comprises at least one polyepoxide having more than one epoxide group wherein the oxygen atom is bonded to vicinal carbon atoms and 10% to 100% by weight of said polyepoxide of at least one curing agent having the Formulae I, II or III.

(I) 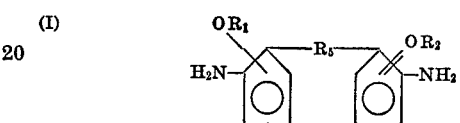

(II) 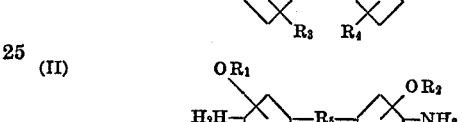

(III) 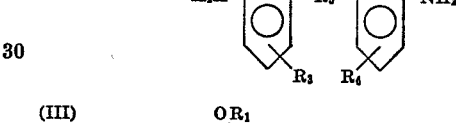

wherein $R_1$, $R_2$, $R_3$ and $R_4$ independently are selected from the class consisting of phenyl, cycloalkyl and lower alkyl radicals having 1 to 8 carbon atoms and $R_5$ is an aliphatic radical of 1 to 3 carbon atoms.

References Cited

UNITED STATES PATENTS 2,981,711   4/1961   Meyer _____ 260—31.2
3,670,024   6/1972   Krimm et al. _____ 260—47 X WILLIAM H. SHORT, Primary Examiner T. E. PERTILLA, Assistant Examiner U.S. Cl. X.R.

117—124 E, 161 ZB; 161—185; 260—2 N, 18 PF, 31.2 R, 31.4 E, 33.4 Ep, 33.6 Ep, 33.8 Ep, 37 Ep, 59.75 Ep, 78.4 Ep, 83.3, 85.1, 94.7 N, 570 D, 830, 831, 836, 837 R